(12) United States Patent
Griswold et al.

(10) Patent No.: US 9,311,493 B2
(45) Date of Patent: Apr. 12, 2016

(54) SYSTEM FOR PROCESSING AN ENCRYPTED INSTRUCTION STREAM IN HARDWARE

(71) Applicants: Richard L. Griswold, West Richland, WA (US); William K. Nickless, Richland, WA (US); Ryan C. Conrad, West Richland, WA (US)

(72) Inventors: Richard L. Griswold, West Richland, WA (US); William K. Nickless, Richland, WA (US); Ryan C. Conrad, West Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 8 days.

(21) Appl. No.: 13/954,487

(22) Filed: Jul. 30, 2013

(65) Prior Publication Data

US 2015/0039905 A1    Feb. 5, 2015

(51) Int. Cl.
*G06F 21/00* (2013.01)
*G06F 21/60* (2013.01)
*G06F 21/72* (2013.01)
*G06F 21/76* (2013.01)

(52) U.S. Cl.
CPC .............. *G06F 21/602* (2013.01); *G06F 21/72* (2013.01); *G06F 21/76* (2013.01)

(58) Field of Classification Search
USPC ......................................................... 713/190
See application file for complete search history.

(56) References Cited

U.S. PATENT DOCUMENTS

| | | | |
|---|---|---|---|
| 4,465,901 A | 8/1984 | Best | |
| 4,814,976 A | 3/1989 | Hansen et al. | |
| 6,345,359 B1 * | 2/2002 | Bianco | 713/190 |
| 7,086,088 B2 | 8/2006 | Narayanan | |
| 8,719,589 B2 * | 5/2014 | Henry et al. | 713/190 |
| 2003/0046563 A1 * | 3/2003 | Ma et al. | 713/190 |
| 2005/0283601 A1 * | 12/2005 | Tahan | 713/2 |
| 2010/0153745 A1 * | 6/2010 | Onno et al. | 713/190 |
| 2010/0246814 A1 | 9/2010 | Olson et al. | |
| 2011/0296202 A1 | 12/2011 | Henry et al. | |
| 2014/0173293 A1 * | 6/2014 | Kapland | 713/190 |
| 2014/0229743 A1 * | 8/2014 | Roden et al. | 713/190 |
| 2014/0281575 A1 * | 9/2014 | Springfield et al. | 713/189 |
| 2014/0337637 A1 * | 11/2014 | Kiperberg et al. | 713/189 |

FOREIGN PATENT DOCUMENTS

WO    2008054456 A2    5/2008

OTHER PUBLICATIONS

US 2010/0122095, 05/2010, Jones et al. (withdrawn).*
International Search Report/Written Opinion for International Application No. PCT/US2014/036675, International Filing Date May 4, 2014, Date of Mailing Jan. 9, 2015.

(Continued)

*Primary Examiner* — Jeffrey Pwu
*Assistant Examiner* — William Corum, Jr.
(74) *Attorney, Agent, or Firm* — A. J. Gokcek (57) ABSTRACT

A system and method of processing an encrypted instruction stream in hardware is disclosed. Main memory stores the encrypted instruction stream and unencrypted data. A central processing unit (CPU) is operatively coupled to the main memory. A decryptor is operatively coupled to the main memory and located within the CPU. The decryptor decrypts the encrypted instruction stream upon receipt of an instruction fetch signal from a CPU core. Unencrypted data is passed through to the CPU core without decryption upon receipt of a data fetch signal.

41 Claims, 5 Drawing Sheets

(56) References Cited

OTHER PUBLICATIONS

KC, G. S., et al., Countering Code-Injection Attacks with Instruction-Set Randomization, Proceedings of the 10th Annual ACM Conference on Computer and Communications Security; [ACM Conference on Computer and Communications Security], Washington D.C., USA, Vol. Conf. 10, Jan. 1, 2003.

Sovarel, A. N., et al., Where's the FEEB? The Effectiveness of Instruction Set Randomization, 14th USENIX Security Symposium, Jul. 31, 2005, 272-280.

Breuer, P. T., et al, A Fully Homomorphic Crypto-Processor Design, Correctness of a Secret Computer, Engineering Secure Softare and Systems, Springer Berlin Heidelberg, Berlin, Feb. 27, 2013, 128-138.

* cited by examiner

SYSTEM FOR PROCESSING AN ENCRYPTED INSTRUCTION STREAM IN HARDWARE

STATEMENT REGARDING FEDERALLY SPONSORED RESEARCH OR DEVELOPMENT

The invention was made with Government support under Contract DE-AC05-76RLO1830, awarded by the U.S. Department of Energy. The Government has certain rights in the invention.

TECHNICAL FIELD

This invention relates to cyber security. More specifically, this invention relates to instruction stream randomization by providing support in hardware for executing encrypted code running in a central processing unit (CPU).

BACKGROUND OF THE INVENTION

Successful cyber attacks often leverage the fact that an instruction set architecture of a target system is well known. Given knowledge of the instruction set architecture, attackers can prepare malicious software, knowing with high confidence that it will run once introduced into the target system via code-injection attacks or other attack vectors.

Instruction stream randomization (ISR) seeks to thwart these attacks by creating unique, dynamic system architectures, thus denying attackers the asymmetric advantage of a well-known target architecture by forcing them to expend considerable resources for each system they wish to compromise. However, previous ISR research has been hampered by the need for hardware emulators to implement the necessary changes to the CPU.

SUMMARY OF THE INVENTION

In accordance with one embodiment of the present invention, a system for processing an encrypted instruction stream in hardware is disclosed. The system includes a main memory for storing the encrypted instruction stream and unencrypted data. The system also includes a CPU operatively coupled to the main memory via a unified instruction and data bus. The system further includes a decryptor coupled to the unified instruction and data bus. The decryptor decrypts the encrypted instruction stream upon receipt of an instruction fetch signal from a CPU core, and the decryptor passes the unencrypted data through without decryption upon receipt of a data fetch signal from the CPU core.

The system may further comprise a cache for receiving the decrypted instruction stream from the decryptor, wherein the decryptor is coupled between the cache and the main memory. In one embodiment, the cache is not directly accessible from instructions executing on the CPU.

The system may further comprise a memory controller coupled between the cache and the CPU core. The memory controller receives the decrypted stream and the unencrypted data.

The system may further comprise a boot controller for initializing the CPU to start executing the encrypted instruction stream immediately without requiring an unencrypted software boot strapping routine.

In one embodiment, during the initialization the CPU reads a cryptographic key from dedicated storage and a nonce value from a dedicated address in the instruction stream. A key used by the decryptor is derived from, but not limited to, at least one of the following: the cryptographic key, the nonce, or a CPU counter. The cryptographic key can be contained within an internal register of the decryptor.

In one embodiment, the key is derived using an Advanced Encryption Standard (AES) algorithm with a 128-bit key length.

In one embodiment, the nonce is located at the beginning of the instruction stream. The nonce can be generated anew each time the instruction stream is encrypted.

In one embodiment, the instruction stream is periodically re-encrypted at intervals during operation of the CPU.

The CPU is, but not limited to, a MIPS CPU, an ARM-based CPU, or an x86 CPU, and may be implemented in a field-programmable gate array (FPGA). Alternatively, the CPU may be implemented in an application-specific integrated circuit (ASIC).

In one embodiment, the decryptor uses an AES algorithm in counter mode (AES-CTR) with a 128-bit key length. Other encryption standards and key lengths, such as a 196-bit key length or 256-bit key length, may be used by the decryptor.

The main memory is, but not limited to, a random-access memory (RAM). The RAM is, but not limited to, a synchronous dynamic RAM (SDRAM).

The decryptor can utilize a checksum or a hash value to detect an improperly decrypted instruction stream.

The system can re-initialize the CPU to a predefined state when the improperly decrypted instruction stream is detected. In one embodiment, the system sets a CPU program counter to a non-sequential value when the improperly decrypted instruction stream is detected.

In another embodiment of the present invention, a system for processing an encrypted instruction stream in hardware is disclosed. The system includes a main memory for storing the encrypted instruction stream and unencrypted data. The system also includes a CPU operatively coupled to the main memory via a separate instruction bus and data bus. The system further includes a decryptor coupled to the instruction bus but not the data bus. The decryptor decrypts the encrypted instruction stream upon receipt of an instruction via the instruction bus.

In another embodiment of the present invention, a system for processing an encrypted instruction stream in hardware is disclosed. The system includes a main memory for storing the encrypted instruction stream and unencrypted data. The system also includes a CPU operatively coupled to the main memory. The system further includes a decryptor operatively coupled to the main memory and located within the CPU. The decryptor decrypts the encrypted instruction stream upon receipt of an instruction fetch signal from a CPU core. Unencrypted data is passed through to the CPU core without decryption upon receipt of a data fetch signal.

In another embodiment of the present invention, a method of initializing a decryptor is disclosed. The method includes pausing a CPU, wherein a program counter does not increment, while a boot controller performs the following: reading a nonce value from a first predetermined location; storing the nonce value in a first hardware register of the decryptor; reading a cryptographic key from a second predetermined location; storing the cryptographic key in a second hardware register of the decryptor; forming an initial counter value from the nonce value; and sending the initial counter value to the decryptor, wherein the CPU resumes operations after the decryptor initializes.

DETAILED DESCRIPTION OF THE PREFERRED EMBODIMENTS

The Present Invention includes systems and methods of processing an encrypted instruction stream in hardware are disclosed. These systems and methods prevent the successful execution of code-injection attacks and, more broadly, the successful execution of any malicious or unauthorized binary code on a system.

In one embodiment, the Present Invention also replaces the cryptographically insecure methods with a cryptographically secure cipher, turning ISR into "instruction stream encryption". In another embodiment, the Present Invention also does away with slow and vulnerable software infrastructures in favor of placing all of the components necessary to support instruction stream encryption directly into hardware. This provides much faster execution times and reduced attack surface, which increases system security.

The Present Invention can protect all code that executes on the system from the very first instruction. In one embodiment, by having no unencrypted instructions the Present Invention eliminates windows of opportunity for hackers. The Present Invention also does not require a software infrastructure or helper modules to support the execution of the encrypted instruction stream.

In one embodiment, an implementation of ISR in a soft-core CPU capable of directly executing an Advanced Encryption Standard (AES) encrypted instruction stream is disclosed which does not require an emulation layer or additional software components. This provides a direct avenue for higher performance implementations in ASICs and custom semiconductor fabrications. Implementation of this instruction stream encryption complements existing security infrastructure and provides strong protection for high assurance environments where there is a high probability of compromise. Design goals for instruction stream encryption include, but are not limited to, high performance, cryptographically secure encryption, and self-containment.

In some embodiments, the implementation is in hardware rather than relying on a hardware emulation layer. The CPU may be implemented in a FPGA, which provides a direct path to higher performance implementations in ASICs or custom semiconductor fabrications.

AES in counter mode (AES-CTR) may be used for the encryption algorithm. Implemented properly, AES-CTR provides high resilience against cryptanalysis and requires only enough memory to store the encryption key and counter value. With a 128-bit key length, this comes to 256 bits of storage for the key and counter value.

With a self-contained implementation, the CPU does not have to rely on other software components, such as encrypting loaders, to initialize or manage the ISR subsystem. Removing the need for such software components reduces the attack surface, because software no longer needs access to the encryption key. By placing the encryption key outside of software access, an attacker cannot coerce the system into divulging the encryption key.

Figure 1:
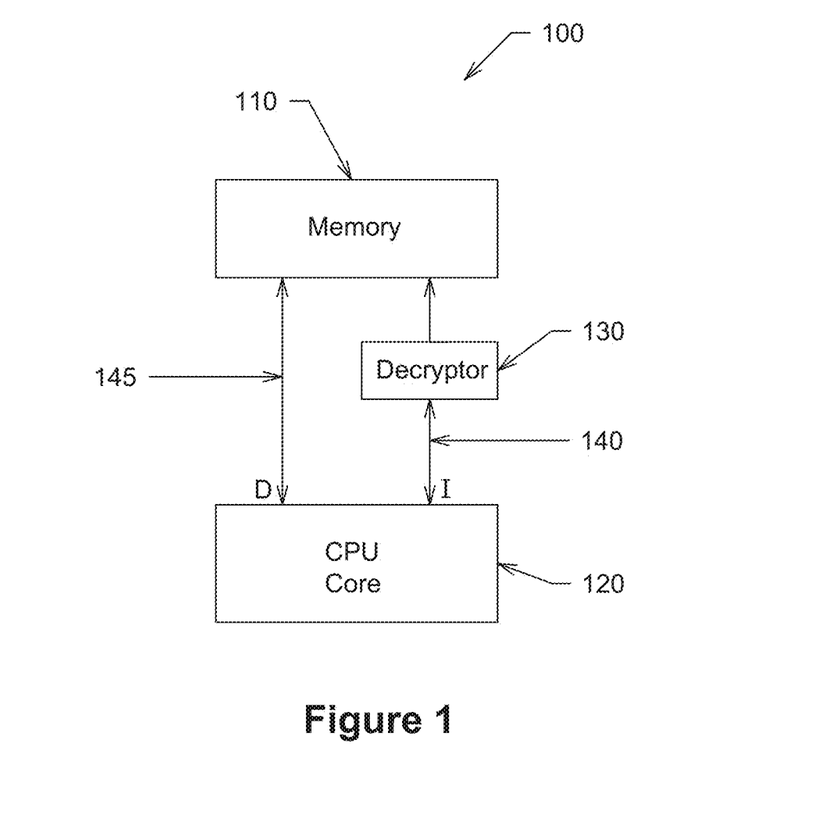
FIG. 1 illustrates a block diagram of a system for processing an encrypted instruction stream in hardware displaying a CPU operatively coupled to the main memory via a separate instruction bus and data bus, with a decryptor coupled to the instruction bus but not the data bus, in accordance with one embodiment of the present invention.

FIG. 1 illustrates a block diagram of a system 100 for processing an encrypted instruction stream in hardware displaying a CPU 120 operatively coupled to the main memory 110 via a separate instruction bus 140 and data bus 145, with a decryptor 130 coupled to the instruction bus 140 but not the data bus 145, in accordance with one embodiment of the present invention. The main memory 110 stores an encrypted instruction stream and unencrypted data. The decryptor 130 decrypts the encrypted instruction stream upon receipt of an instruction via the instruction bus 140.

Figure 2:
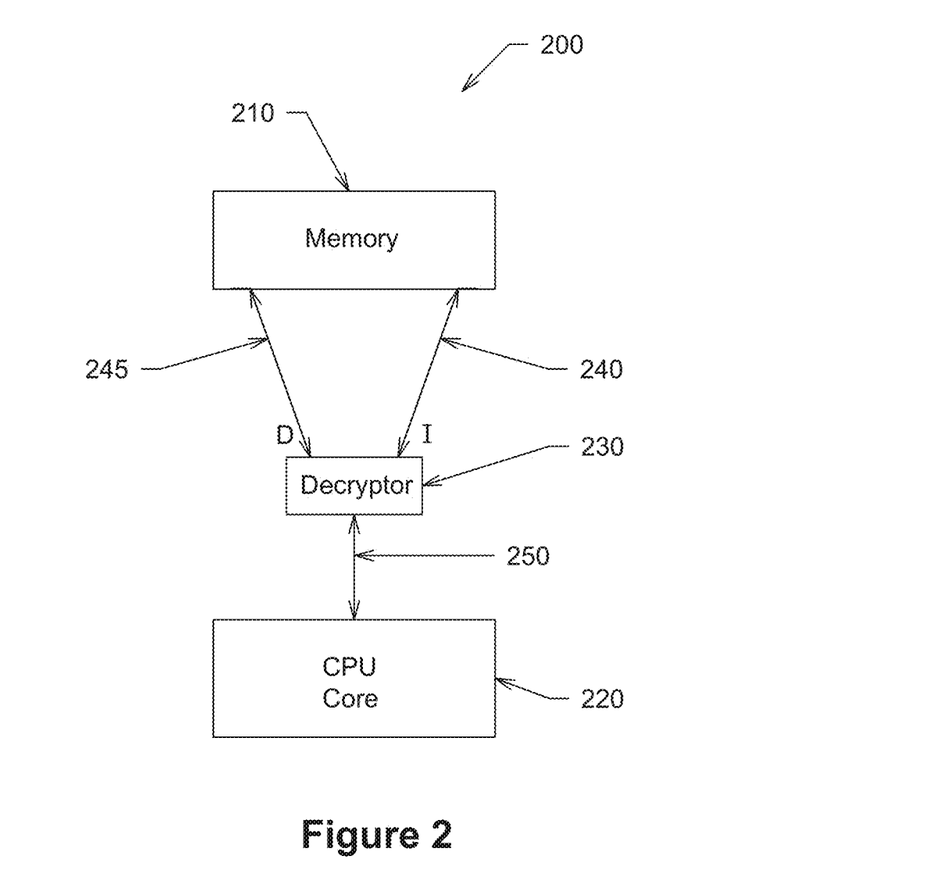
FIG. 2 illustrates a block diagram of a system for processing an encrypted instruction stream in hardware displaying a CPU operatively coupled to the main memory via a decryptor that is coupled to a unified instruction and data bus, in accordance with one embodiment of the present invention.

FIG. 2 illustrates a block diagram of a system 200 for processing an encrypted instruction stream in hardware displaying a CPU 220 operatively coupled to the main memory 210 via a decryptor 230 that is coupled to a unified instruction and data bus 250, in accordance with one embodiment of the present invention. The decryptor 230 may receive instructions and data from the main memory 210 via separate instruction and data buses 240 and 245, respectively.

Figure 4:
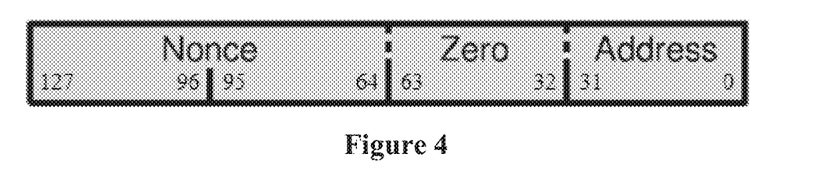
FIG. 4 illustrates a counter value that is 128 bits in length, with a 32-bit address padded with 32 bits of zero.

In one embodiment, as mentioned above, the Present Invention uses AES in counter mode for the encryption algorithm. An element that adds to the robustness of AES-CTR is the use of a nonce, or "number used once", wherein a counter value with the same encryption key may be reused without compromising security. The counter value may be generated by concatenating a 64-bit nonce with the address of the start of each block of instructions as depicted in FIG. 4. Because the counter value is, in this example, 128 bits in length, the 32-bit address is padded with 32 bits of zeros. The 64-bit nonce is randomly generated each time the software is encrypted for the device, thus ensuring that the same counter value is never used twice with the same key. The counter value is encrypted with each device's unique key to create the cipher block to encrypt each block of instructions. A 128-bit key is used, in this embodiment, so each key stream block holds four fixed-sized 32-bit instructions.

Figure 5:
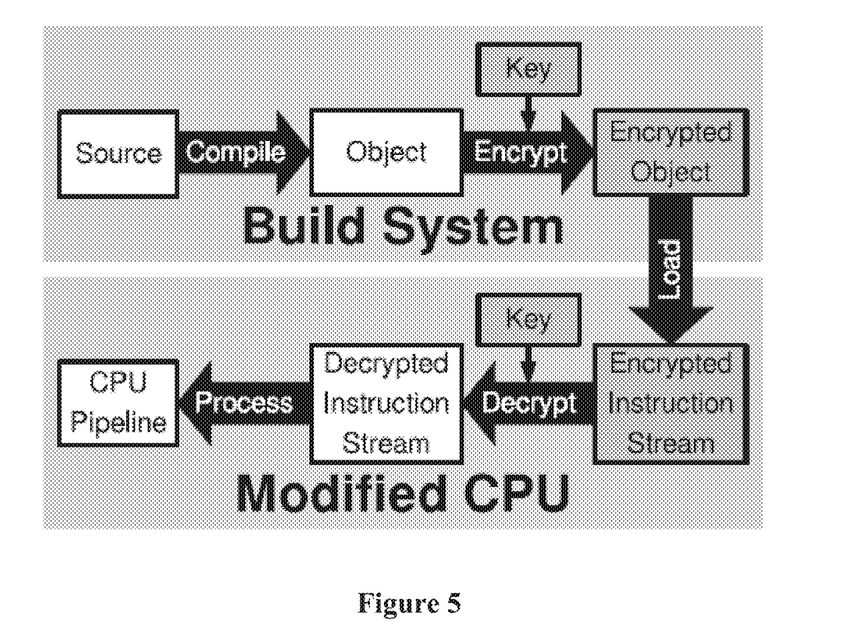
FIG. 5 illustrates a block diagram of the encryption and decryption process, with the encryption performed offline, in accordance with one embodiment of the present invention.

In one embodiment, since software access to the system is not allowed, all encryption must be done offline as depicted in FIG. 5. This prevents attackers from creating properly encrypted code on a device that is using ISR.

In one embodiment, the Present Invention uses the same key for encryption and decryption, so the encryption key is stored on the device that uses ISR. Key storage and key register are not software addressable. During initialization, the processor reads the encryption key from dedicated storage and the nonce from, as one example, the first eight bytes of memory. It uses the nonce and the program counter to create the counter value as described previously. The nonce may be read from other locations.

One effect of disallowing software access to the system is that software has no mechanism for switching the CPU between encrypted and unencrypted mode. Instead, the CPU always operates in encrypted mode, starting with the first instruction it executes. This prevents an attacker from forcing the CPU into unencrypted mode, since the CPU is incapable of operating in unencrypted mode. The system provides a mechanism or the CPU to get the three components needed to decrypt the instructions: the encryption key, the nonce, and the current program counter value, without relying on software support. The encryption key may be hard-coded into the soft-core processor image, but it could read from any dedicated non-volatile storage. The nonce does not need to be protected as carefully as the encryption key, so it can be stored at a known location in memory. In one embodiment, the nonce is stored at address 0, before the start of bootloader code.

Figure 3:
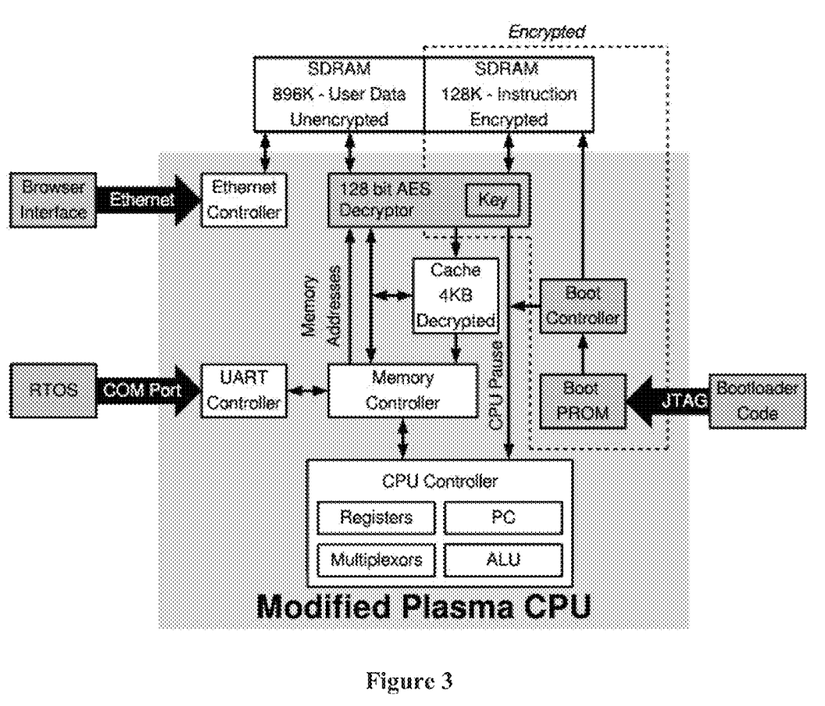
FIG. 3 illustrates a block diagram for processing an encrypted instruction stream, in accordance with one embodiment of the present invention.

FIG. 3 illustrates a block diagram of a system for processing an encrypted instruction stream, in accordance with one embodiment of the present invention. In this embodiment, the CPU of the system requires that no unencrypted instructions are executed, and that no user data is decrypted. To ensure this, the decryptor (or decryptor interface) is placed between the CPU and the main memory, SDRAM. In the embodiment of FIG. 3, the SDRAM stores the encrypted instruction stream and unencrypted data. The CPU controller, which includes registers, multiplexors, a program counter, and an arithmetic logic unit, is operatively coupled to the main memory via a separate instruction bus and data bus. The decryptor is coupled to the instruction bus but not the data bus. The Ethernet Controller has no direct access to the CPU and other peripherals do not have the data width to execute instructions.

In one embodiment, the decryptor reads a key from an internal register and builds subkeys calculated for each round of encryption. The key is inaccessible by the user. The 64-bit nonce is read and stored as a fixed upper half of the counter value. After these startup routines, the CPU is enabled and the decryptor examines all data to determine if decryption is necessary. The decryptor may decrypt the data if it is flagged as an instruction rather user data and/or it is located in the instruction address space of memory. These conditions prevent an attacker from executing unencrypted instructions from user data address space and catch any exceptions in instruction address space.

To mitigate any decreased performance from run-time decryption, the system of FIG. 3 may include, but is not limited to, several additions: an unencrypted instruction cache, a cipher block cache, and decryption clock multiplication. A direct mapped cache stores unencrypted instructions, thus reducing the total number of decryptions necessary. The cache is only addressable by the memory controller, which is not software/user accessible. The decrypted cipher block cache allows the CPU to bypass the decryption phase for sequential instructions. In one embodiment, for each decryption processed, four words are decrypted, thus reducing the overall decryption time by approximately 75%. Decryption clock multiplication reduces decryption latency. Since propagation delay through the decryption core is less that of the CPU, the decryption clock can be run at higher frequencies than the CPU clock.

The system may optionally use a dedicated hardware boot controller. An implementation with limited local static RAM/PROM may utilize a boot controller to allow a larger bootloader and simplify bootloader addressing. A boot controller that initializes main memory and copies the encrypted bootloader code into the main memory was designed. The CPU then begins executing the bootloader code, at which point a user can load more encrypted code and unencrypted user data into the main memory via the UART interface. This embodiment preserves the security features of the system and allows running from a single memory peripheral.

Experimental Section

The following examples serve to illustrate embodiments and aspects of the present invention and are not to be construed as limiting the scope thereof.

In order to provide proof of concept, the ISR CPU system of FIG. 3 was implemented on a Spartan 3E Starter Board using the open-source Plasma soft-core CPU. This development board contains a low-grade Xilinx FPGA and basic user peripherals supported by Plasma such as UART, SRAM, DDR, and Ethernet. The CPU was interfaced with a basic decryption core, the Avalon AES ECB-core, by adding a small finite state machine (FSM) to coordinate memory fetches, cache checks/misses, and data decryption. Performance optimizations and a hardware boot controller were added to ensure seamless startup and normal operations. The Plasma system includes the source code for the processor as well as an emulator and a small real-time operating system (RTOS) with a network stack and web server.

A simple benchmark was chosen for performance testing. The Plasma RTOS comes with a HTTP server, which was configured to serve the same image in three different formats: as a 41,733 byte GIF, an 11,088 byte JPEG, and a 3,444 byte PNG. The test program downloads the image 100 times in each format, while measuring the elapsed time. This team ensures that the decryptor is exercised and its performance factors into the measurements, since the 4 kB decrypted instruction cache is not large enough to hold all of the code used in handling the network traffic and HTTP requests. Elapsed time for running on the processor without encryption was 308.64 s, while elapsed time with encryption enabled was 323.91 s, or an increase of 4.95% in run time.

Figure 6:
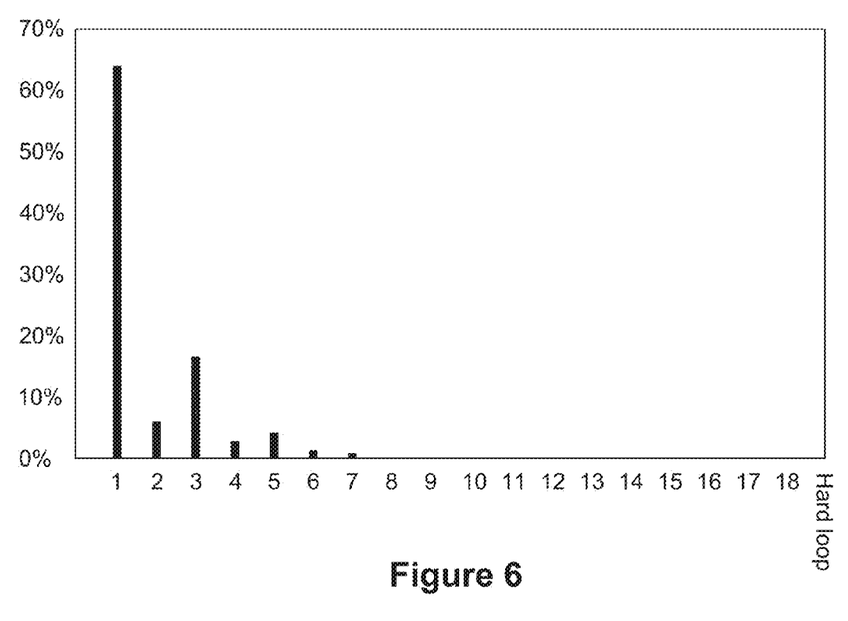
FIG. 6 is a graph of the test results generated by applying random instruction streams to mimic improperly encrypted instruction streams that were fed into a process core using the architecture as depicted in FIG. 3. The test results show the percentage of improperly encrypted instruction streams that halted after n instructions.

A simulation was run to determine how many instructions, on average, the processor would execute from an improperly encrypted instruction stream before halting. Since AES-CTR does not validate the integrity of the encrypted instruction stream, the encryption engine passes the results of the decryption to the processor core to execute regardless of whether the instruction stream was properly encrypted. However, when the incoming instruction stream is not properly encrypted, the resulting instruction stream will contain invalid instructions or memory accesses. 500,000 random instruction streams were generated to mimic improperly encrypted instruction streams, and fed them into the processor core. The test results are given in Table 1 below and shown graphically in FIG. 6. Almost 64% of the time the system halted on the first instruction. Over 99% of the time, the CPU encountered an illegal instruction or other malformed instruction that caused an exception or interrupt within seven instructions. In no instance did it run for more than 18 instructions without experiencing an exception or interrupt, unless the invalid instruction stream placed the system in a hard loop.

TABLE 1

| Instructions Before Halting | Individual Tests | | Cumulative | |
| --- | --- | --- | --- | --- |
| | Count | Percent | Count | Percent |
| 1 | 318488 | 63.70% | 318488 | 63.70% |
| 2 | 34138 | 6.83% | 352626 | 70.53% |
| 3 | 83243 | 16.65% | 435869 | 87.17% |
| 4 | 17209 | 3.44% | 453078 | 90.62% |
| 5 | 24339 | 4.87% | 477417 | 95.48% |
| 6 | 10511 | 2.10% | 487928 | 97.59% |
| 7 | 8473 | 1.69% | 496401 | 99.28% |
| 8 | 1301 | 0.26% | 497702 | 99.54% |
| 9 | 1140 | 0.23% | 498842 | 99.77% |
| 10 | 782 | 0.16% | 499624 | 99.92% |

TABLE 1-continued

| Instructions Before Halting | Individual Tests | | Cumulative | |
|---|---|---|---|---|
| | Count | Percent | Count | Percent |
| 11 | 43 | 0.01% | 499667 | 99.93% |
| 12 | 278 | 0.06% | 499945 | 99.99% |
| 13 | 8 | 0.00% | 499953 | 99.99% |
| 14 | 5 | 0.00% | 499958 | 99.99% |
| 15 | 3 | 0.00% | 499961 | 99.99% |
| 16 | 1 | 0.00% | 499962 | 99.99% |
| 17 | 1 | 0.00% | 499963 | 99.99% |
| 18 | 1 | 0.00% | 499964 | 99.99% |
| Hard loop | 36 | 0.01% | 500000 | 100.00% |

As this example showed, the system can efficiently execute a fully encrypted instruction stream and successfully block improperly encrypted code.

As discussed above, the AES-CTR algorithm does not provide verification of the decrypted results. Instead, the system relies on the statistical probability that the improperly encrypted instruction stream will contain an invalid instruction or memory access. The results above show that 99% of the time, the system will halt within seven instructions. However, the system is not guaranteed to encounter a malformed or illegal instruction that causes an exception or interrupt, and about 0.01% of the time it will instead go into a hard loop.

In one embodiment, switching to another encryption algorithm which provides both integrity and confidentiality, such as AES in Galois Counter Mode (AES-GCM), would allow the hardware to detect an improperly encrypted instruction prior to execution. The system could then distinguish between illegal instruction and addressing errors, and improperly encrypted instruction stream errors and then respond in a controlled, deterministic manner. For example, if an incorrect encryption key is detected, such as via a decryption error message, the system can take one or more protective actions. These protective actions include, but are not limited to, the following: resetting to a known "good" code, raising an interrupt, alerting operators, or dropping the instruction frame.

The embodiments described above have broad uses such as, but not limited to, the energy sector, critical infrastructure, security, and areas that involve network enabled embedded devices. In the embedded systems space, one specific application would be for smart grid meters which allow access to the electrical grid infrastructure, and in some cases devices in customers' homes, from a computer network.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A system for processing an encrypted instruction stream in hardware comprising:
  a. a main memory for storing the encrypted instruction stream and unencrypted data;
  b. a central processing unit (CPU) operatively coupled to the main memory via a unified instruction and data bus;
  c. a decryptor coupled to the unified instruction and data bus, wherein the decryptor decrypts the encrypted instruction stream upon receipt of an instruction fetch signal from a CPU core and wherein the decryptor passes the unencrypted data through without decryption upon receipt of a data fetch signal from the CPU core, wherein the CPU only executes instructions that have been decrypted by the CPU; and
  d. a boot controller for initializing the CPU to start executing the encrypted instruction stream immediately without requiring an unencrypted software boot strapping routine, wherein the CPU is initialized with only encrypted instructions that have already been encrypted off-line.

2. The system of claim 1 further comprising a cache for receiving the decrypted instruction stream from the decryptor, wherein the decryptor is coupled between the cache and the main memory.

3. The system of claim 2 wherein the cache is not directly accessible from instructions executing on the CPU.

4. The system of claim 2 further comprising a memory controller coupled between the cache and the CPU core, wherein the memory controller receives the decrypted stream and the unencrypted data.

5. The system of claim 1 wherein during the initialization the CPU reads a cryptographic key from dedicated storage and a nonce value from a dedicated address in the instruction stream.

6. The system of claim 5 wherein a key used by the decryptor is derived from at least one of the following: the cryptographic key, the nonce, and a CPU program counter.

7. The system of claim 5 wherein the nonce is located at the beginning of the instruction stream.

8. The system of claim 7 wherein the nonce is generated anew each time the instruction stream is encrypted.

9. The system of claim 5 wherein the cryptographic key is contained within an internal register of the decryptor.

10. The system of claim 9 wherein the internal register is not software or user accessible.

11. The system of claim 1 wherein the instruction stream is periodically re-encrypted at intervals during operation of the CPU.

12. The system of claim 1 wherein the CPU is implemented in a field-programmable gate array (FPGA).

13. The system of claim 1 wherein the CPU is at least one of the following: a MIPS CPU, an ARM-based CPU, and an x86 CPU.

14. The system of claim 1 wherein the decryptor uses an Advanced Encryption Standard (AES) algorithm in counter mode (AES-CTR) with a 128-bit key length.

15. The system of claim 1 wherein the main memory is a random-access memory.

16. The system of claim 15 wherein the random-access memory is a synchronous dynamic random-access memory (SDRAM).

17. The system of claim 1 wherein the decryptor utilizes a checksum or a hash value to detect an improperly decrypted instruction stream.

18. The system of claim 17 wherein the system re-initializes the CPU to a predefined state when the improperly decrypted instruction stream is detected.

19. The system of claim 17 wherein the system sets a CPU program counter to a non-sequential value when the improperly decrypted instruction stream is detected.

20. A system for processing an encrypted instruction stream in hardware comprising:
  a. a main memory for storing the encrypted instruction stream and unencrypted data;

b. a central processing unit (CPU) operatively coupled to the main memory via a separate instruction bus and data bus;

c. a decryptor coupled to the instruction bus but not the data bus, wherein the decryptor decrypts the encrypted instruction stream upon receipt of an instruction via the instruction bus, wherein the CPU only executes instructions that have been decrypted by the CPU; and d. a boot controller for initializing the CPU to start executing the encrypted instruction stream immediately without requiring an unencrypted software boot strapping routine, wherein the CPU is initialized with only encrypted instructions that have already been encrypted off-line.

21. The system of claim 20 further comprising a cache for receiving the decrypted instruction stream from the decryptor, wherein the decryptor is coupled between the cache and the main memory.

22. The system of claim 21 wherein the cache is not directly accessible from instructions executing on the CPU.

23. The system of claim 21 further comprising a memory controller coupled between the cache and the CPU core, wherein the memory controller receives the decrypted stream and the unencrypted data.

24. The system of claim 20 wherein during the initialization the CPU reads a cryptographic key from dedicated storage and a nonce value from a dedicated address in the instruction stream.

25. The system of claim 24 wherein a key used by the decryptor is derived from at least one of the following: the cryptographic key, the nonce value, and a CPU program counter.

26. The system of claim 24 wherein the nonce value is located at the beginning of the instruction stream.

27. The system of claim 26 wherein the nonce value is generated anew each time the instruction stream is encrypted.

28. The system of claim 24 wherein the cryptographic key is contained within an internal register of the decryptor.

29. The system of claim 28 wherein the internal register is not software or user accessible.

30. The system of claim 20 wherein the instruction stream is periodically re-encrypted at intervals during operation of the CPU.

31. The system of claim 20 wherein the CPU is implemented in a field-programmable gate array (FPGA).

32. The system of claim 20 wherein the CPU is at least one of the following: a MIPS CPU, an ARM-based CPU, and an x86 CPU.

33. The system of claim 20 wherein the decryptor is a 128-bit Advanced Encryption Standard (AES) decryptor.

34. The system of claim 20 wherein the main memory is a random-access memory.

35. The system of claim 34 wherein the random-access memory is a synchronous dynamic random-access memory (SDRAM).

36. The system of claim 20 wherein the decryptor utilizes a checksum or a hash value to detect an improperly decrypted instruction stream.

37. The system of claim 36 wherein the system re-initializes the CPU to a predefined state when the improperly decrypted instruction stream is detected.

38. The system of claim 36 wherein the system sets a CPU program counter to a non-sequential value when the improperly decrypted instruction is detected.

39. A system for processing an encrypted instruction stream in hardware, comprising:

a. a main memory for storing the encrypted instruction stream and unencrypted data;

b. a central processing unit (CPU) operatively coupled to the main memory;

c. a decryptor operatively coupled to the main memory and located within the CPU, wherein the decryptor decrypts the encrypted instruction stream upon receipt of an instruction fetch signal from a CPU core, and wherein unencrypted data is passed through to the CPU core without decryption upon receipt of a data fetch signal, wherein the CPU only executes instructions that have been decrypted by the CPU, and the instructions are encrypted off-line; and d. a boot controller for initializing the CPU to start executing the encrypted instruction stream immediately without requiring an unencrypted software boot strapping routine, wherein the CPU is initialized with only encrypted instructions that have already been encrypted off-line.

40. The system of claim 39 further comprising a unified instruction and data bus coupled between the decryptor and the CPU core, wherein the decryptor decrypts the encrypted instruction stream upon receipt of an instruction fetch signal from the CPU core and passes the unencrypted data through without decryption upon receipt of a data fetch signal from the CPU core.

41. The system of 39 further comprising a data bus coupled between the CPU core and the main memory and an instruction bus coupled between the CPU core and the main memory via the decryptor, the decryptor being coupled to the instruction bus but not the data bus, wherein the decryptor decrypts the encrypted instruction stream upon receipt of an instruction via the instruction bus.

* * * * *